United States Patent
Lin

(10) Patent No.: US 12,543,257 B2
(45) Date of Patent: Feb. 3, 2026

(54) ELECTRONIC DEVICE AND OPERATIONAL STATE INDICATION METHOD USING LIGHTING EFFECT THEREOF

(71) Applicant: Acer Incorporated, New Taipei (TW)

(72) Inventor: Pe-Yi Lin, New Taipei (TW)

(73) Assignee: Acer Incorporated, New Taipei (CN)

( * ) Notice: Subject to any disclaimer, the term of this patent is extended or adjusted under 35 U.S.C. 154(b) by 106 days.

(21) Appl. No.: 18/733,791

(22) Filed: Jun. 4, 2024

(65) Prior Publication Data

US 2025/0318032 A1    Oct. 9, 2025

(30) Foreign Application Priority Data

Apr. 8, 2024   (TW) .................................. 113112927

(51) Int. Cl.
*H05B 47/165* (2020.01)
*H05B 45/10* (2020.01)
(Continued)

(52) U.S. Cl.
CPC ........... *H05B 47/165* (2020.01); *H05B 45/10* (2020.01); *H05B 47/12* (2020.01); *H05B 47/155* (2020.01)

(58) Field of Classification Search
CPC .......... G06F 40/30; G06F 3/011; G06F 3/167; G06F 18/214; G06F 3/017; G06F 3/0482; G06F 3/013; G06F 18/217; G06F 30/27; G06F 18/22; G06F 21/6245; G06F 3/067; G06F 30/20; G06F 17/18; G06F 18/24; G06F 9/4881; G06F 40/35; G06F 40/40; G06F 16/9024; G06F 16/9535; G06F 40/205; G06F 21/32; G06F 16/27; G06F 21/6218; G06F 3/012; G06F 40/20; G06F 16/285; G06F 3/04842; G06F 16/951; G06F 3/0488; G06F 16/2365; G06F 16/2379; G06F 9/542; G06F 40/284; G06F 16/29; G06F 3/04847; G06F 40/295; G06F 3/0484; G06F 9/451; G06F 1/163; G06F 40/279; G06F 17/16; G06F 21/602; G06F 18/2148; G06F 18/2178; G06F 21/577; G06F 9/5027; G06F 16/906; G06F 16/23;

(Continued)

(56) References Cited

U.S. PATENT DOCUMENTS

| 12,456,261 B2 * | 10/2025 | Gautron .................. G06F 30/20 |
| 2024/0015872 A1 | 1/2024 | Li et al. |
| 2024/0086028 A1 | 3/2024 | Cho et al. |

FOREIGN PATENT DOCUMENTS

| CN | 115297597 | 11/2022 |
| CN | 116077924 | 5/2023 |

(Continued)

*Primary Examiner* — Monica C King
(74) *Attorney, Agent, or Firm* — JCIPRNET

(57) ABSTRACT

An electronic device and an operational state indication method using lighting effect thereof are provided. The method is adapted to the electronic apparatus including a light emitting device and includes the following steps. Operation information related to an artificial intelligence function is monitored. Whether the artificial intelligence function is activated is determined based on the operation information. In response to the artificial intelligence function is activated, the light emitting device is controlled to emit indicative light according to a specific lighting effect.

20 Claims, 8 Drawing Sheets

(51) Int. Cl.
*H05B 47/12* (2020.01)
*H05B 47/155* (2020.01)

(58) Field of Classification Search
CPC .. G06F 18/2413; G06F 11/3409; G06F 18/25; G06F 3/165; G06F 16/9035; G06F 3/0481; G06F 9/5072; G06F 16/24578; G06F 3/04883; G06F 3/04815; G06F 16/3329; G06F 16/90344; G06F 3/0619; G06F 18/21; G06F 16/248; G06F 18/23; G06F 16/245; G06F 16/93; G06F 16/182; G06F 3/04817; G06F 16/2477; G06F 16/24575; G06F 3/016; G06F 3/0604; G06F 3/0346; G06F 3/04845; G06F 21/554; G06F 16/26; G06F 16/22; G06F 16/2457; G06F 2221/034; G06F 16/215; G06F 16/288; G06F 9/5077; G06F 11/3452; G06F 21/552; G06F 9/45558; G06F 16/90335; G06F 9/30036; G06F 18/2431; G06F 3/015; G06F 9/541; G06F 3/0659; G06F 16/24564; G06F 3/061; G06F 3/0304; G06F 9/5016; G06F 16/221; G06F 18/251; G06F 16/2228; G06F 16/2455; G06F 11/3495; G06F 3/0608; G06F 7/14; G06F 16/2358; G06F 9/505; G06F 9/3888; G06F 40/216; G06F 16/355; G06F 40/166; G06F 9/3001; G06F 16/254; G06F 30/13; G06F 8/65; G06F 11/3006; G06F 21/6254; G06F 16/212; G06F 40/253; G06F 40/56; G06F 9/3887; G06F 3/0688; G06F 16/90332; G06F 9/54; G06F 16/337; G06F 3/065; G06F 16/219; G06F 16/901; G06F 16/178; G06F 18/2155; G06F 16/2264; G06F 3/1454; G06F 11/3688; G06F 16/313; G06F 40/237; G06F 11/3024; G06F 11/3438; G06F 40/186; G06F 21/53; G06F 21/64; G06F 3/14; G06F 9/3836; G06F 11/2094; G06F 9/544; G06F 16/3344; G06F 16/24; G06F 40/58; G06F 9/453; G06F 16/1734; G06F 16/2272; G06F 16/289; G06F 9/5066; G06F 9/547; G06F 2212/1016; G06F 40/211; G06F 9/466; G06F 3/0635; G06F 21/31; G06F 11/0793; G06F 9/5005; G06F 16/122; G06F 16/256; G06F 7/5443; G06F 9/5044; G06F 11/302; G06F 40/289; G06F 3/147; G06F 16/24558; G06F 16/235; G06F 9/3877; G06F 16/28; G06F 12/0246; G06F 16/273; G06F 18/241; G06F 3/04886; G06F 16/258; G06F 21/44; G06F 3/0673; G06F 16/2386; G06F 30/15; G06F 18/211; G06F 3/0485; G06F 9/5038; G06F 3/014; G06F 2203/04803; G06F 2201/84; G06F 16/9536; G06F 2201/81; G06F 9/3851; G06F 3/0653; G06F 11/079; G06F 16/35; G06F 40/169; G06F 40/103; G06F 16/9038; G06F 18/213; G06F 2203/04808; G06F 9/3838; G06F 11/3692; G06F 11/3034; G06F 16/2456; G06F 3/0486; G06F 1/1652; G06F 2212/455; G06F 3/16; G06F 16/243; G06F 16/583; G06F 2201/865; G06F 1/1686; G06F 21/316; G06F 18/24323; G06F 3/064; G06F 2203/011; G06F 12/0811; G06F 11/1469; G06F 18/285; G06F 18/2414; G06F 12/0875; G06F 9/50; G06F 21/105; G06F 3/005; G06F 3/0647; G06F 16/9538; G06F 3/0679; G06F 11/0751; G06F 12/0862; G06F 11/3447; G06F 16/958; G06F 9/30043; G06F 1/26; G06F 11/108; G06F 18/40; G06F 2221/033; G06F 2221/2111; G06F 21/566; G06F 21/6209; G06F 2212/1024; G06F 3/0483; G06F 40/106; G06F 11/3466; G06F 18/253; G06F 16/953; G06F 18/2411; G06F 2209/509; G06F 21/604; G06F 9/5011; G06F 17/00; G06F 21/55; G06F 8/71; G06F 9/3891; G06F 9/4806; G06F 18/24133; G06F 2009/4557; G06F 3/1423; G06F 40/242; G06F 9/5083; G06F 1/3206; G06F 1/3231; G06F 21/35; G06F 2203/0381; G06F 18/10; G06F 18/2113; G06F 11/3684; G06F 18/24143; G06F 9/3004; G06F 9/44505; G06F 16/51; G06F 8/34; G06F 9/30014; G06F 18/256; G06F 1/324; G06F 16/25; G06F 18/2163; G06F 2212/1044; G06F 30/12; G06F 3/0683; G06F 1/1624; G06F 9/3802; G06F 9/546; G06F 1/206; G06F 16/2282; G06F 2218/00; G06F 11/3433; G06F 1/1694; G06F 2009/45595; G06F 3/0631; G06F 1/3296; G06F 16/1865; G06F 8/60; G06F 13/28; G06F 15/8046; G06F 2212/302; G06F 16/24568; G06F 16/9537; G06F 21/606; G06F 1/28; G06F 12/1009; G06F 16/5854; G06F 11/3476; G06F 16/909; G06F 1/1626; G06F 12/0804; G06F 16/287; G06F 16/904; G06F 2218/12; G06F 3/0644; G06F 8/61; G06F 18/23213; G06F 3/038; G06F 12/0871; G06F 16/38; G06F 8/38; G06F 1/3287; G06F 11/3698; G06F 18/2415; G06F 18/29; G06F 21/57; G06F 9/4843; G06F 11/0709; G06F 12/0891; G06F 16/334; G06F 40/174; G06F 9/30047; G06F 16/532; G06F 18/2193; G06F 3/0655; G06F 12/0238; G06F 16/907; G06F 3/048; G06F 11/3058; G06F 11/3055; G06F 12/0802; G06F 9/3867; G06F 16/2308; G06F 21/62; G06F 3/041; G06F 3/0617; G06F 40/117; G06F 8/36; G06F 16/36; G06F 21/00; G06F 2203/04806; G06F 3/0652; G06F 3/0685; G06F 12/0897; G06F 16/3347; G06F 2203/04106; G06F 2212/1008; G06F 40/177; G06F 9/5094; G06F 16/908; G06F 18/28; G06F 16/90328; G06F 3/0611; G06F 2212/6026; G06F 2212/7208; G06F 9/52; G06F 16/43; G06F 16/903; G06F 18/41; G06F 2201/88; G06F 2212/401; G06F 40/18; G06F 9/30038; G06F 9/485; G06F 8/30; G06F 16/435; G06F 30/10; G06F 21/45; G06F 2212/608; G06F 12/0895; G06F 18/2185; G06F 2209/503; G06F 3/0446; G06F 40/247; G06F 9/30145; G06F 16/284; G06F 2111/10; G06F 3/0614;

G06F 16/955; G06F 3/0632; G06F
1/1677; G06F 11/3419; G06F 16/24565;
G06F 11/0727; G06F 11/2097; G06F
12/0888; G06F 16/587; G06F 21/6227;
G06F 2212/6028; G06F 40/109; G06F
9/30079; G06F 9/38885; G06F
2009/45562; G06F 40/47; G06F 7/483;
G06F 9/383; G06F 11/1464; G06F
12/0882; G06F 16/211; G06F 16/322;
G06F 16/353; G06F 16/53; G06F
16/9017; G06F 18/2321; G06F 3/0412;
G06F 1/16; G06F 16/116; G06F 16/275;
G06F 1/3265; G06F 12/084; G06F 15/76;
G06F 16/438; G06F 18/20; G06F
18/24147; G06F 3/04812; G06F 3/0689;
G06F 9/455; G06F 15/173; G06F
2201/815; G06F 11/2089; G06F 12/0866;
G06F 16/9027; G06F 2207/4824; G06F
2221/2141; G06F 1/329; G06F 11/3013;
G06F 12/0607; G06F 16/535; G06F
21/10; G06F 2212/1032; G06F
2212/7205; G06F 3/0665; G06F 8/35;
G06F 16/55; G06F 9/30087; G06F
11/1441; G06F 16/48; G06F 9/545; G06F
1/3203; G06F 16/24556; G06F
2209/5019; G06F 40/126; G06F
16/24542; G06F 16/335; G06F 18/2115;
G06F 2209/545; G06F 7/58; G06F 7/588;
G06F 8/41; G06F 1/30; G06F 11/1076;
G06F 11/2023; G06F 16/2465; G06F
16/328; G06F 2212/652; G06F 3/01;
G06F 3/0605; G06F 9/3818; G06F 1/20;
G06F 16/00; G06F 16/144; G06F 16/345;
G06F 2009/45587; G06F 2212/1021;
G06F 2212/601; G06F 3/04166; G06F
16/24569; G06F 16/58; G06F 21/6263;
G06F 21/78; G06F 3/04186; G06F
3/0649; G06F 30/398; G06F 9/30065;
G06F 11/076; G06F 12/0215; G06F
16/9577; G06F 18/254; G06F 9/548;
G06F 15/7839; G06F 16/2393; G06F
2212/60; G06F 30/00; G06F 9/5055;
G06F 9/5061; G06F 12/0893; G06F
12/12; G06F 16/33; G06F 3/0607; G06F
3/0613; G06F 40/197; G06F 8/77; G06F
16/24522; G06F 17/15; G06F 2111/20;
G06F 2212/154; G06F 3/0616; G06F
40/226; G06F 9/5088; G06F 11/2071;
G06F 12/128; G06F 40/274; G06F
1/3215; G06F 16/24573; G06F 16/5866;
G06F 16/9014; G06F 18/24137; G06F
21/16; G06F 2201/86; G06F 2212/2542;
G06F 7/575; G06F 11/2028; G06F
13/1626; G06F 16/538; G06F 2201/805;
G06F 40/14; G06F 1/3243; G06F 16/252;
G06F 2009/45583; G06F 2221/2117;
G06F 30/23; G06F 13/1668; G06F
18/2433; G06F 7/16; G06F 9/522; G06F
11/0721; G06F 11/2064; G06F 11/3062;
G06F 11/3065; G06F 16/1873; G06F
16/332; G06F 18/245; G06F 18/295;
G06F 21/76; G06F 21/86; G06F
2203/0383; G06F 2221/2115; G06F
3/03543; G06F 3/0425; G06F 9/30123;
G06F 9/452; G06F 9/461; G06F 1/1658;
G06F 1/1688; G06F 1/169; G06F 11/34;
G06F 11/3604; G06F 12/0806; G06F
12/0815; G06F 12/1441; G06F 16/21;
G06F 11/1451; G06F 16/2246; G06F
16/338; G06F 2209/501; G06F 30/18;
G06F 11/008; G06F 11/0772; G06F
17/11; G06F 3/0656; G06F 40/134; G06F
9/30101; G06F 11/3051; G06F 16/2237;
G06F 16/278; G06F 21/56; G06F
2201/82; G06F 2212/454; G06F 3/044;
G06F 9/3009; G06F 16/367; G06F 21/54;
G06F 3/0664; G06F 40/45; G06F
9/30025; G06F 9/30032; G06F 13/4282;
G06F 16/283; G06F 16/7837; G06F
3/1446; G06F 8/443; G06F 1/1684; G06F
16/71; G06F 21/60; G06F 2212/1052;
G06F 3/0622; G06F 3/0658; G06F
40/123; G06F 1/1698; G06F 16/383;
G06F 16/54; G06F 2203/04801; G06F
2212/7204; G06F 3/0237; G06F 1/1656;
G06F 11/0757; G06F 18/24155; G06F
2209/508; G06F 3/0487; G06F 3/0629;
G06F 40/232; G06F 9/5022; G06F
11/3485; G06F 16/9566; G06F 3/03547;
G06F 3/0416; G06F 1/3212; G06F
16/1824; G06F 16/735; G06F 21/629;
G06F 2221/2101; G06F 11/2092; G06F
11/3072; G06F 12/0253; G06F 13/4022;
G06F 2203/04101; G06F 3/0625; G06F
9/46; G06F 1/263; G06F 12/0284; G06F
16/3334; G06F 2203/04104; G06F
3/0641; G06F 40/151; G06F 8/63; G06F
9/4856; G06F 9/4887; G06F 11/3037;
G06F 16/2255; G06F 17/153; G06F
21/74; G06F 21/84; G06F 2200/201;
G06F 8/75; G06F 9/4401; G06F 9/4411;
G06F 9/45533; G06F 9/5033; G06F
11/1471; G06F 11/3089; G06F 12/023;
G06F 16/316; G06F 2111/18; G06F
2212/452; G06F 8/10; G06F 11/327;
G06F 11/3612; G06F 11/3636; G06F
16/24532; G06F 16/24537; G06F
2009/45579; G06F 2111/02; G06F
2212/7201; G06F 2221/2149; G06F
3/0623; G06F 9/3016; G06F 9/543; G06F
12/0842; G06F 16/434; G06F 2209/506;
G06F 2213/0026; G06F 3/0643; G06F
9/48; G06F 16/128; G06F 16/683; G06F
2212/657; G06F 40/44; G06F 8/51; G06F
9/4451; G06F 9/4893; G06F 11/2069;
G06F 12/0837; G06F 16/183; G06F
16/2471; G06F 16/41; G06F 16/433;
G06F 11/1453; G06F 13/4027; G06F
15/7807; G06F 2221/2113; G06F 30/392;
G06F 12/1408; G06F 16/13; G06F
18/2135; G06F 2212/262; G06F 3/00;
G06F 3/0646; G06F 11/0766; G06F
16/176; G06F 16/24544; G06F 18/2111;
G06F 2009/45591; G06F 21/71; G06F
2119/18; G06F 9/4498; G06F 1/1643;
G06F 1/3209; G06F 11/3608; G06F
12/0813; G06F 12/109; G06F 16/7867;
G06F 21/36; G06F 21/85; G06F 9/30181;
G06F 9/44526; G06F 11/30; G06F
11/3428; G06F 12/0207; G06F 12/0292;

G06F 2111/16; G06F 2211/005; G06F 3/03545; G06F 8/20; G06F 8/33; G06F 12/10; G06F 16/1844; G06F 16/40; G06F 2209/5011; G06F 2212/502; G06F 8/00; G06F 9/445; G06F 1/1637; G06F 11/0778; G06F 16/137; G06F 16/2428; G06F 16/954; G06F 16/9558; G06F 21/50; G06F 2201/835; G06F 2221/2103; G06F 8/76; G06F 11/1435; G06F 11/2041; G06F 11/323; G06F 11/3457; G06F 12/0868; G06F 16/24552; G06F 16/685; G06F 16/957; G06F 21/43; G06F 21/52; G06F 21/572; G06F 2113/10; G06F 2113/16; G06F 2212/263; G06F 2218/08; G06F 2221/2139; G06F 3/0661; G06F 40/263; G06F 1/08; G06F 11/1048; G06F 11/1461; G06F 11/2048; G06F 11/3442; G06F 13/4068; G06F 15/80; G06F 17/40; G06F 2209/5017; G06F 7/57; G06F 8/433; G06F 9/30072; G06F 1/203; G06F 11/1004; G06F 16/2423; G06F 16/783; G06F 16/95; G06F 16/9554; G06F 16/972; G06F 16/986; G06F 21/34; G06F 21/568; G06F 2212/1028; G06F 2212/1056; G06F 2221/2107; G06F 3/0634; G06F 40/268; G06F 1/3234; G06F 11/1438; G06F 12/1027; G06F 16/1827; G06F 16/242; G06F 16/2462; G06F 16/483; G06F 16/5846; G06F 18/2323; G06F 21/73; G06F 2201/80; G06F 2212/214; G06F 2221/032; G06F 30/17; G06F 30/39; G06F 40/131; G06F 40/51; G06F 1/1605; G06F 11/0739; G06F 11/0787; G06F 11/1458; G06F 11/1666; G06F 11/3414; G06F 15/16; G06F 16/2425; G06F 16/5838; G06F 18/2132; G06F 2113/12; G06F 2119/06; G06F 3/0637; G06F 7/523; G06F 11/0769; G06F 11/3003; G06F 11/3696; G06F 16/164; G06F 16/1748; G06F 16/217; G06F 16/2315; G06F 16/3331; G06F 16/635; G06F 17/10; G06F 21/575; G06F 2203/0384; G06F 2203/04102; G06F 2212/7203; G06F 3/0626; G06F 40/143; G06F 1/3228; G06F 1/3275; G06F 11/0754; G06F 11/1448; G06F 11/2025; G06F 13/1673; G06F 16/1774; G06F 16/24553; G06F 21/51; G06F 2111/04; G06F 2218/10; G06F 3/0418; G06F 9/3885; G06F 1/1681; G06F 11/2007; G06F 11/2082; G06F 16/2453; G06F 16/282; G06F 16/34; G06F 16/739; G06F 21/33; G06F 21/88; G06F 2113/14; G06F 2203/04108; G06F 2207/382; G06F 3/0443; G06F 3/0447; G06F 3/0489; G06F 7/38; G06F 9/3834; G06F 1/1673; G06F 11/3075; G06F 12/0857; G06F 15/7867; G06F 16/61; G06F 16/70; G06F 18/15; G06F 2009/45575; G06F 2212/1048; G06F 2221/2143; G06F 30/28; G06F 40/194; G06F 7/02; G06F 8/447; G06F 8/70; G06F 8/73; G06F 1/1616; G06F 1/3293; G06F 11/1446; G06F 11/201; G06F 11/2035; G06F 11/2076; G06F 16/1834; G06F 16/487; G06F 16/90324; G06F 18/231; G06F 21/79; G06F 2212/261; G06F 3/023; G06F 3/0235; G06F 3/06; G06F 8/31; G06F 9/3013; G06F 1/1632; G06F 1/1641; G06F 1/266; G06F 11/004; G06F 11/0706; G06F 11/1484; G06F 11/2005; G06F 16/213; G06F 16/214; G06F 16/743; G06F 21/72; G06F 2201/85; G06F 2209/548; G06F 40/10; G06F 9/30076; G06F 9/3814; G06F 11/0781; G06F 13/1689; G06F 13/409; G06F 15/8007; G06F 16/2458; G06F 16/9574; G06F 21/1063; G06F 21/107; G06F 21/46; G06F 2200/1637; G06F 2201/875; G06F 2209/484; G06F 2209/5018; G06F 3/0445; G06F 3/04892; G06F 40/114; G06F 40/55; G06F 9/4418; G06F 11/203; G06F 11/301; G06F 11/3616; G06F 12/04; G06F 15/00; G06F 16/1794; G06F 16/2322; G06F 16/45; G06F 2207/3824; G06F 2213/28; G06F 2221/2133; G06F 3/0227; G06F 3/033; G06F 3/0383; G06F 3/0414; G06F 3/0671; G06F 3/1431; G06F 40/137; G06F 8/4441; G06F 9/44521; G06F 1/1635; G06F 1/3278; G06F 11/366; G06F 12/10072; G06F 12/1081; G06F 12/126; G06F 16/31; G06F 16/3322; G06F 16/3338; G06F 16/3346; G06F 16/90; G06F 21/562; G06F 21/564; G06F 21/565; G06F 2209/505; G06F 3/0638; G06F 3/162; G06F 30/347; G06F 8/656; G06F 1/14; G06F 1/3218; G06F 11/00; G06F 11/328; G06F 11/368; G06F 15/167; G06F 16/686; G06F 16/784; G06F 21/14; G06F 21/556; G06F 21/70; G06F 2111/06; G06F 40/00; G06F 7/24; G06F 7/491; G06F 9/3873; G06F 9/4862; G06F 1/1647; G06F 11/0736; G06F 11/1068; G06F 11/1662; G06F 12/08; G06F 12/0846; G06F 16/4393; G06F 16/444; G06F 16/56; G06F 21/563; G06F 2203/04103; G06F 2212/1041; G06F 2213/0042; G06F 3/0219; G06F 3/0231; G06F 3/062; G06F 3/0662; G06F 30/327; G06F 7/78; G06F 9/355; G06F 9/4552; G06F 9/526; G06F 1/32; G06F 1/3246; G06F 11/1456; G06F 11/2038; G06F 11/2236; G06F 13/4221; G06F 16/10; G06F 16/24534; G06F 16/3326; G06F 16/7844; G06F 16/9032; G06F 17/17; G06F 21/6272; G06F 2113/04; G06F 2212/7207; G06F 3/0233; G06F 3/0236; G06F 3/0667; G06F 40/42; G06F 8/427; G06F 8/658; G06F 8/72; G06F 9/3012; G06F 9/45508; G06F 1/1639; G06F 1/3237; G06F 11/073; G06F 11/0775; G06F 11/1092; G06F 11/263; G06F 11/3668; G06F 13/385; G06F 15/8053; G06F 16/65; G06F 17/13; G06F 18/232; G06F 21/40; G06F 2203/0382; G06F 2209/504; G06F 2212/6042; G06F 2212/202; G06F 2221/2137; G06F 3/0325; G06F 30/34; G06F 5/01; G06F

7/50; G06F 8/45; G06F 9/30185; G06F 1/12; G06F 11/2263; G06F 11/362; G06F 11/3676; G06F 12/1433; G06F 16/2219; G06F 16/437; G06F 16/73; G06F 18/2133; G06F 2115/12; G06F 2119/22; G06F 2203/04802; G06F 2209/5021; G06F 2212/152; G06F 2212/163; G06F 2221/2119; G06F 3/04162; G06F 3/04895; G06F 8/311; G06F 8/441; G06F 8/52; G06F 9/3555; G06F 9/38585; G06F 9/44; G06F 9/4812; G06F 1/325; G06F 11/2015; G06F 11/261; G06F 11/3423; G06F 12/14; G06F 16/162; G06F 16/1858; G06F 16/24545; G06F 16/24549; G06F 16/24561; G06F 16/2468; G06F 16/632; G06F 16/638; G06F 16/7834; G06F 21/335; G06F 21/645; G06F 2119/08; G06F 2209/5014; G06F 2209/541; G06F 2212/602; G06F 2212/6024; G06F 2221/2151; G06F 3/02; G06F 3/04182; G06F 3/045; G06F 30/3308; G06F 40/12; G06F 7/08; G06F 8/456; G06F 8/54; G06F 9/30112; G06F 9/30134; G06F 9/30189; G06F 3/3824; G06F 9/3858; G06F 9/3893; G06F 9/4494; G06F 1/1671; G06F 1/189; G06F 11/0742; G06F 11/2053; G06F 11/2056; G06F 11/3068; G06F 11/324; G06F 12/0684; G06F 12/0864; G06F 12/123; G06F 13/10; G06F 13/1663; G06F 16/16; G06F 16/1744; G06F 16/24554; G06F 16/33295; G06F 16/358; G06F 16/738; G06F 21/755; G06F 2212/651; G06F 2221/2123; G06F 3/0238; G06F 3/04855; G06F 30/30; G06F 7/00; G06F 7/4876; G06F 8/436; G06F 9/3455; G06F 9/38; G06F 9/3869; G06F 9/3875; G06F 9/467; G06F 9/468; G06F 9/4831; G06F 1/10; G06F 1/187; G06F 1/3225; G06F 11/142; G06F 11/1433; G06F 11/1466; G06F 11/1482; G06F 11/2066; G06F 12/1036; G06F 13/1621; G06F 13/1694; G06F 16/3328; G06F 16/75; G06F 18/00; G06F 18/2137; G06F 18/24765; G06F 21/81; G06F 2203/012; G06F 2203/04804; G06F 2212/151; G06F 2212/62; G06F 2212/211; G06F 2216/03; G06F 3/0338; G06F 30/3323; G06F 30/337; G06F 30/367; G06F 40/157; G06F 8/44; G06F 9/3842; G06F 9/45504; G06F 1/3262; G06F 11/0784; G06F 11/1417; G06F 11/202; G06F 12/0223; G06F 12/121; G06F 13/16; G06F 13/1642; G06F 15/17318; G06F 15/8061; G06F 16/148; G06F 16/2433; G06F 16/24535; G06F 16/30; G06F 16/3323; G06F 16/381; G06F 16/787; G06F 16/9532; G06F 18/23211; G06F 21/1075; G06F 21/121; G06F 21/6236; G06F 2203/0331; G06F 2212/621; G06F 2212/656; G06F 2212/7209; G06F 3/018; G06F 3/03; G06F 3/0601; G06F 30/373; G06F 40/258; G06F 7/76; G06F 8/42; G06F 8/74; G06F 9/30; G06F 9/3854; G06F 9/4403; G06F 1/3253; G06F 11/26; G06F 11/27; G06F 11/325; G06F 11/3628; G06F 15/7825; G06F 16/119; G06F 16/168; G06F 16/17; G06F 16/1727; G06F 16/188; G06F 16/436; G06F 16/81; G06F 18/2136; G06F 21/1014; G06F 21/30; G06F 21/305; G06F 21/567; G06F 2200/1614; G06F 2203/013; G06F 2203/04105; G06F 2203/04112; G06F 2209/502; G06F 2209/5022; G06F 2212/7206; G06F 2216/11; G06F 3/0362; G06F 3/04164; G06F 30/333; G06F 40/49; G06F 7/49942; G06F 7/544; G06F 8/445; G06F 8/53; G06F 9/3863; G06F 1/1683; G06F 11/0712; G06F 11/0715; G06F 11/10; G06F 11/2033; G06F 11/3624; G06F 11/3648; G06F 12/0831; G06F 12/0877; G06F 12/1466; G06F 15/163; G06F 15/7817; G06F 16/2452; G06F 16/24526; G06F 16/639; G06F 17/142; G06F 21/80; G06F 2203/0339; G06F 2209/482; G06F 2212/222; G06F 2212/251; G06F 2212/403; G06F 2213/40; G06F 2221/2105; G06F 2221/2109; G06F 2221/2135; G06F 2221/2145; G06F 3/002; G06F 3/1203; G06F 30/343; G06F 7/4833; G06F 9/00; G06F 9/382; G06F 9/3856; G06F 9/3861; G06F 9/4405

See application file for complete search history.

(56) References Cited

FOREIGN PATENT DOCUMENTS

| | | |
|---|---|---|
| CN | 117202446 | 12/2023 |
| CN | 117729675 | 3/2024 |
| TW | M602650 | 10/2020 |
| TW | M607622 | 2/2021 |

\* cited by examiner

ELECTRONIC DEVICE AND OPERATIONAL STATE INDICATION METHOD USING LIGHTING EFFECT THEREOF

CROSS-REFERENCE TO RELATED APPLICATION

This application claims the priority benefit of Taiwan application serial no. 113112927, filed on Apr. 8, 2024. The entirety of each of the above-mentioned patent applications is hereby incorporated by reference herein and made a part of this specification.

BACKGROUND

Technical Field

The disclosure relates to an electronic device, and in particular to an electronic device and an operational state indication method using lighting effect thereof.

Description of Related Art

With the rapid development of artificial intelligence technology, consumer electronic devices have gradually integrated many artificial intelligence functions, making them not just a traditional computing device but more like an intelligent assistant. The applications of artificial intelligence technology are extensive and diverse, providing users with more convenience and functions. For example, artificial intelligence technology enables consumer electronic devices to better understand and respond to user instructions and needs. Through natural language processing technology, consumer electronic devices may more accurately recognize voice commands or text input to perform corresponding operations based on the user's intentions, thus improving efficiency and convenience. Alternatively, by analyzing the user's operating habits and preferences, consumer electronic devices may automatically provide corresponding suggestions and recommendations to help users complete their work faster or obtain required information. In general, the application of artificial intelligence technology brings more intelligent functions and better user experience to consumer electronic devices. However, although artificial intelligence functions may be integrated into consumer electronic devices, general public users cannot clearly know whether the artificial intelligence functions are working behind the scenes, which may lead to some confusion and opacity in operation.

SUMMARY

The disclosure proposes an electronic device and an operational state indication method using lighting effect, which may solve the above technical problems.

Embodiments of the disclosure provide an operational state indication method using lighting effect, which is adapted to an electronic device including a light emitting device and includes the following steps. Operation information related to an artificial intelligence function is monitored. Whether the artificial intelligence function is activated is determined based on the operation information. In response to the artificial intelligence function is activated, the light emitting device is controlled to emit indicative light according to a specific lighting effect.

An embodiment of the disclosure provides an electronic device, which includes a light emitting device, a storage device, and a processor. The storage device records instructions. The processor is coupled to the light emitting device and the storage device and is configured to execute the instructions to perform the following operations. Operation information related to an artificial intelligence function is monitored. Whether the artificial intelligence function is activated is determined based on the operation information. In response to the artificial intelligence function is activated, the light emitting device is controlled to emit indicative light according to a specific lighting effect.

Based on the above, in embodiments of the disclosure, by monitoring the operation information related to the artificial intelligence function, whether the artificial intelligence function is activated may be determined. When the artificial intelligence function is activated, the light emitting device may emit indicative light with a specific lighting effect. Based on this, the light emitting device may provide corresponding indicative light effects based on the activation of artificial intelligence functions, allowing users to clearly understand whether the current operation utilizes the artificial intelligence functionalities of the electronic device, thereby significantly enhancing the transparency of artificial intelligence operations and user experience.

DESCRIPTION OF THE EMBODIMENTS

Some embodiments of the disclosure will be described in detail with reference to the accompanying drawings. The component symbols cited in the following description will be regarded as the same or similar components when the same component symbols appear in different drawings. These embodiments are only part of the disclosure and do not disclose all possible implementations of the disclosure. Rather, these embodiments are only examples of methods and apparatuses within the scope of the patent application of the disclosure.

Figure 1:
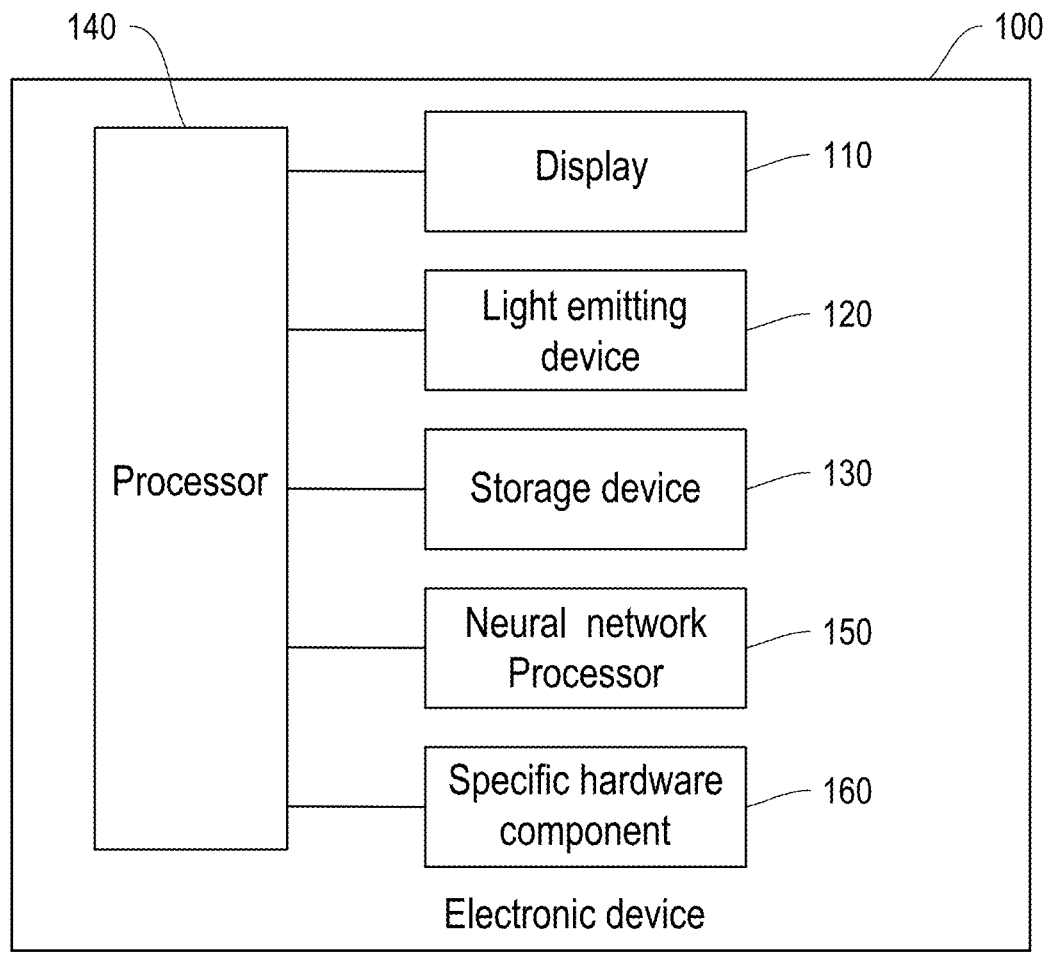
FIG. 1 is a block diagram of an electronic device according to an embodiment of the disclosure.

FIG. 1 is a block diagram of an electronic device according to an embodiment of the disclosure. Referring to FIG. 1, the electronic device 100 includes a display 110, a light emitting device 120, a storage device 130, a processor 140, a neural network processor (also referred to as Neural Processing Unit or Neural Network Processing Unit, NPU)

150, and a specific hardware component 160. The electronic device 100 is, for example, a smart phone, a tablet computer, a notebook computer, an all-in-one computer, etc., and the disclosure is not limited thereto.

The display 110 is, for example, a liquid crystal display (LCD), a Light-Emitting Diode (LED) display, an organic LED (OLED) display or other types of displays, which the disclosure is not limited to. The display 110 may be configured to display a user operation interface.

The light emitting device 120 includes multiple LEDs and may emit indicative lights with different lighting effects. The light emitting device 120 may include color (RGB) light-emitting diodes, monochrome light-emitting diodes, or combinations thereof. In some embodiments, the light emitting device 120 may be built into or externally connected to the electronic device 100. Alternatively, in some embodiments, the light emitting device 120 may be integrated into peripheral devices or internal components of the electronic device 100, such as illuminated fans, illuminated memory modules, illuminated touchpads, or illuminated keyboards, among others.

The neural network processor 150 is a hardware accelerator specially designed for processing artificial intelligence (AI) workloads and configured to execute neural network computations. The neural network processor 150 accelerates inference operations for machine learning and deep learning models, including Convolutional Neural Networks (CNN), Recurrent Neural Networks (RNN), Transformer, and others. The neural network processor 150 includes numerous low-power processing cores, enabling efficient and low-power consumption neural network computations.

The specific hardware component 160 is a hardware component that may be applied to or provide artificial intelligence functions, and the specific hardware component 160 may include sensors or specific function integrated circuits. In some embodiments, the specific hardware component 160 may be a sensor or an audio processor. For example, the specific hardware component 160 may be a vision sensor or a Time of Flight (TOF) sensor, but it is not limited thereto. In some embodiments, low-level firmware code embedded in specific hardware components 160 may provide artificial intelligence functions.

The storage device 130 is configured to store data and software modules (such as operating systems, applications, drivers) for access by the processor 140. The storage device 130 may be, for example, any type of fixed or removable random access memory (RAM), read-only memory (ROM), flash memory, hard disk, or a combination thereof.

The processor 140 is coupled to the display 110, the light emitting device 120, the storage device 130, the neural network processor 150, and the specific hardware component 160, and may be a general-purpose processor, special-purpose processor, traditional processor, digital signal processor, multiple microprocessors, one or more microprocessors with integrated digital signal processor cores, controllers, microcontrollers, Application Specific Integrated Circuits (ASICs), Field Programmable Gate Arrays (FPGAs), any other type of integrated circuit, state machine, Advanced RISC Machine (ARM) based processor, and the like. The processor 140 may access and execute instructions or code stored in the storage device 130 to implement the method of in the embodiments of the disclosure.

Figure 2:
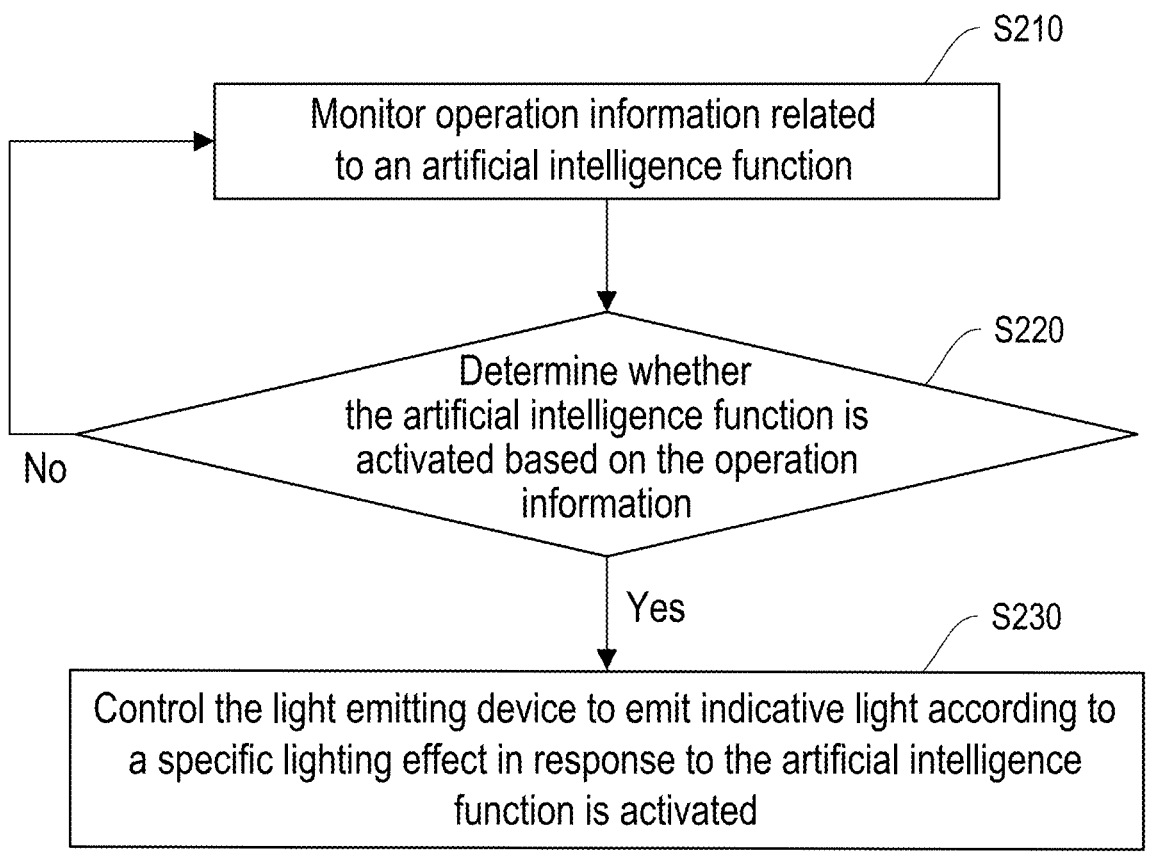
FIG. 2 is a flowchart of an operational state indication method using lighting effect according to an embodiment of the disclosure.

FIG. 2 is a flowchart of an operational state indication method using lighting effect according to an embodiment of the disclosure, and the method of FIG. 2 may be implemented by components of the electronic device 100 in FIG. 1. Please referring to both FIG. 1 and FIG. 2, the following is a description of the steps of the operational state indication method using lighting effect in one embodiment with reference to various components of the electronic device 100 in FIG. 1.

In step S210, the processor 140 may monitor operation information related to an artificial intelligence function. The artificial intelligence function is a function implemented using a neural network model or a machine learning model. For example, the artificial intelligence function may be an audio noise reduction function using a neural network model or a machine learning models, a video optimization function using a neural network model or a machine learning model, an image generation function or a content generation using large language models, a information search function using large language models, or a Human Presence Detection function using a neural network model or a machine learning model, etc.

In some embodiments, the processor 140 may monitor the operating status of some application programs to obtain operating information related to an artificial intelligence function. In some embodiments, processor 140 may monitor the operating status of neural network processor 150 to obtain operating information related to an artificial intelligence function. In some embodiments, processor 140 may monitor the operating status of specific hardware components 160 to obtain operating information related to an artificial intelligence function.

In step S220, the processor 140 may determine whether the artificial intelligence function is activated based on the operation information. Specifically, the processor 140 may determine whether the artificial intelligence function is operating based on the monitored operation information. That is to say, the processor 140 may determine whether the electronic device 100 drives a machine learning model or neural network model stored locally or in the cloud to provide model output data based on the monitored operation information. If the determination in step S220 is yes, in step S230, in response to the activation of the artificial intelligence function, the processor 140 controls the light emitting device 120 to emit indicative light according to a specific lighting effect. In this way, the user may observe the indicative light emitted by the light emitting device 120 and know that the artificial intelligence function of the electronic device 100 is operating or not.

Therefore, users can avoid confusion about whether current operations involve artificial intelligence functionalities, thereby effectively enhancing the transparency and trustworthiness of using artificial intelligence functions. Additionally, since artificial intelligence functions may involve tasks related to handling user's privacy data, the indicative light of the light emitting device 120 can notify users that privacy data may be stored or leaked due to the operation of artificial intelligence functions. On the other hand, the indicative lights emitted by the light emitting device 120 can also allow device developers or maintenance personnel to confirm the normal operation of artificial intelligence functions, speeding up the troubleshooting process for malfunction issues.

Figure 3:
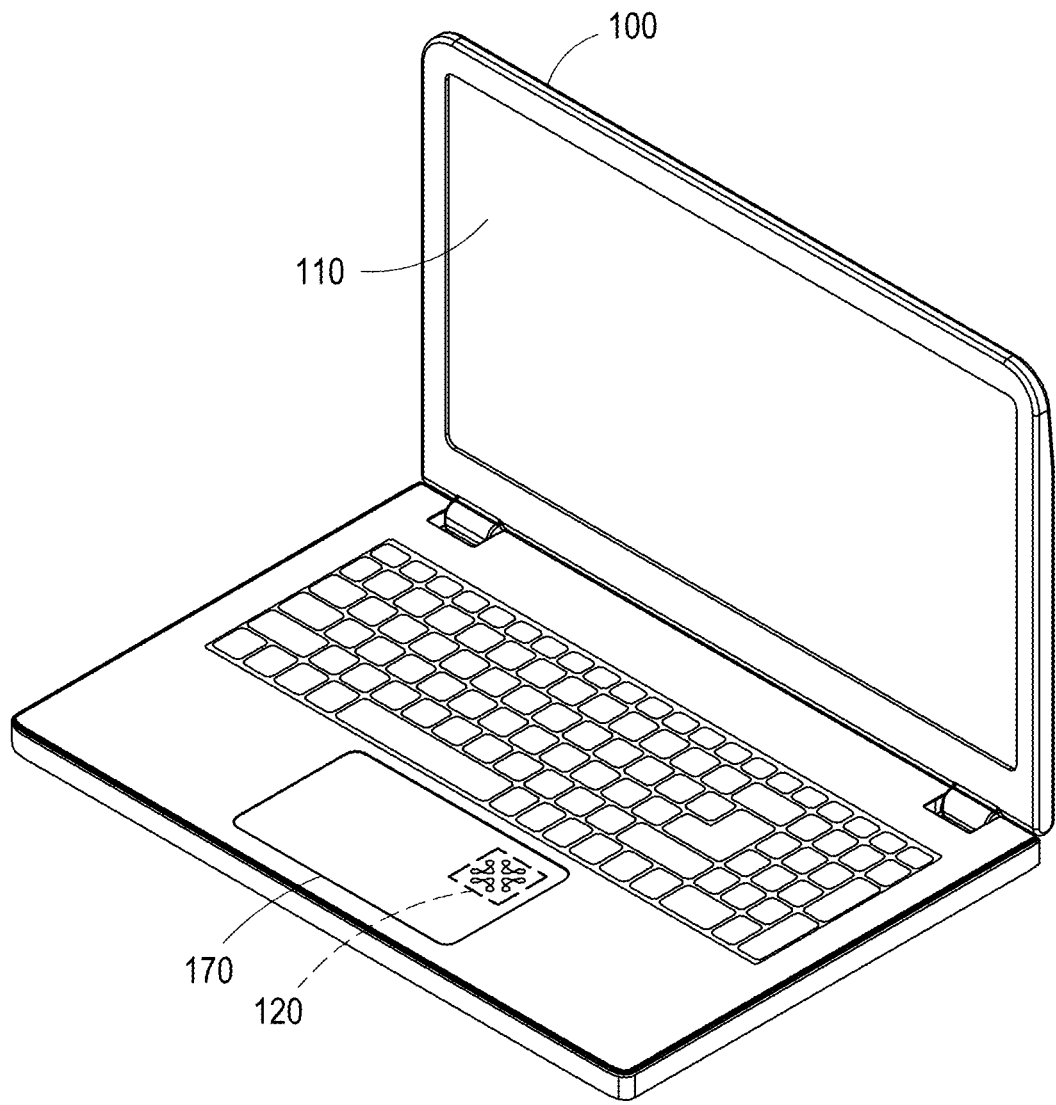
FIG. 3 is a schematic diagram of a light emitting device integrated with a touch panel according to an embodiment of the disclosure.

FIG. 3 is a schematic diagram of a light emitting device integrated into a touch panel according to an embodiment of the disclosure. Referring to FIG. 3, in some embodiments, the light emitting device 120 may be integrated with the touch panel 170 of the electronic device 100. The touch panel 170 includes a light-transmissive pattern, so that the indicative light emitted by the light emitting device 120 disposed under the touch panel 170 may penetrate the light-transmissive pattern and appear as patterned indicative light. In the example of FIG. 3, the light-transmissive pattern on the touch panel 170 may be in the shape of multiple petals, for example. When the artificial intelligence function on the electronic device 100 is activated, the light emitting device 120 may emit the indicative light so that the user may observe the patterned indicative light.

Figure 4:
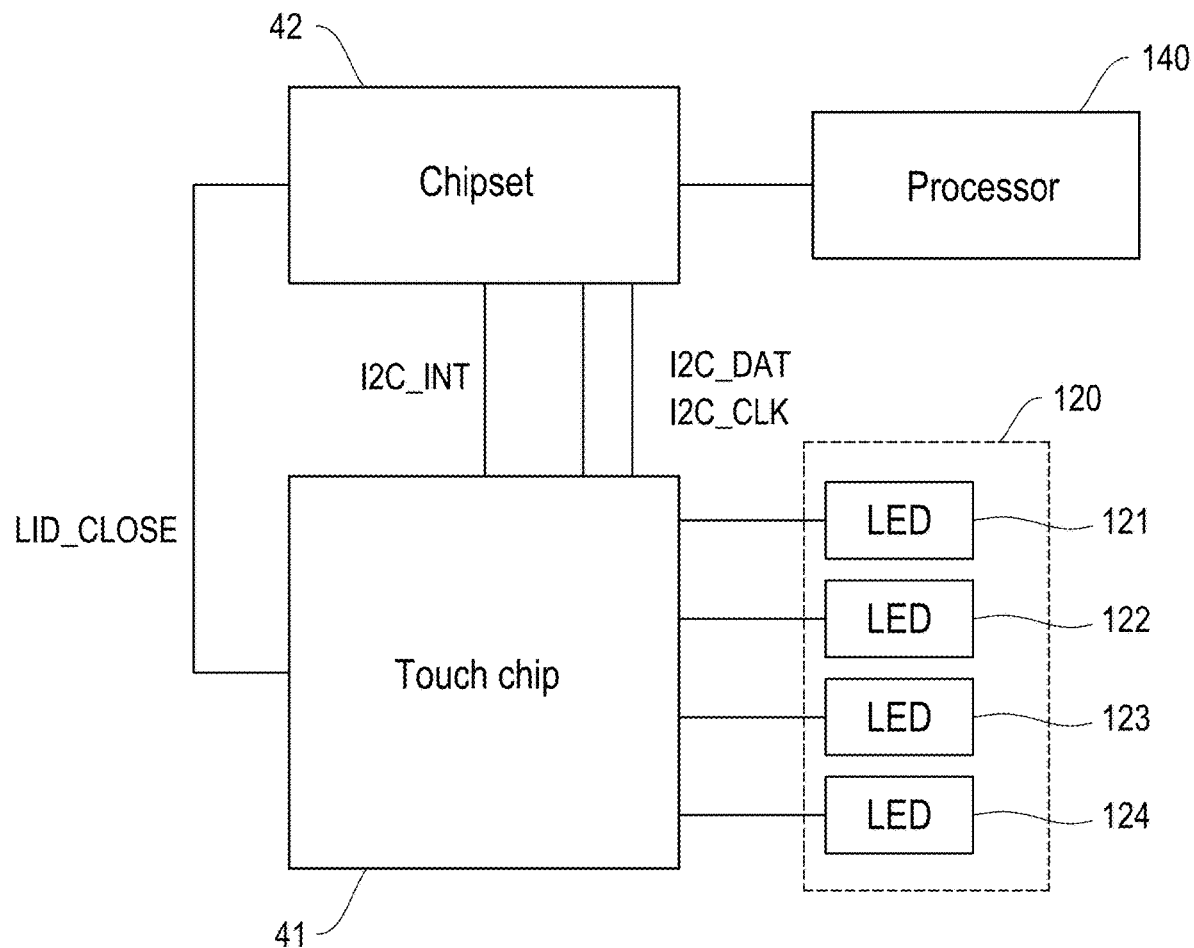
FIG. 4 is a schematic diagram of a touch chip driving a light emitting device according to an embodiment of the disclosure.

FIG. 4 is a schematic diagram of a touch chip driving a light emitting device according to an embodiment of the disclosure. Referring to FIG. 4, in some embodiments, the touch chip 41 may be responsible for driving the light emitting device 120. For example, in an embodiment in which the light emitting device 120 is integrated with the touch panel 170 of the electronic device 100, the touch chip 41 may be responsible for driving the light emitting device 120 as well. As shown in FIG. 4, the electronic device 100 may also include a touch chip 41 and a chipset 42. The chipset 42 is, for example, a Platform Controller Hub (PCH).

The chipset 42 is connected between the processor 140 and the touch chip 41. The chipset 42 may be connected to the touch chip 41 through the I2C interface, that is, the serial data signal I2C_DAT and the clock signal I2C_CLK of the I2C interface are used to communicate with the touch chip 41. In addition, the chipset 42 may initialize the I2C interface through the initialization signal I2C_INT.

In this embodiment, the chipset 42 may also provide the lid close signal LID_CLOSE to the touch chip 41 to notify the touch chip 41 that the notebook computer is in a closed state or an open state. When the touch chip 41 receives the lid close signal LID_CLOSE with a specific level, the touch chip 41 may disable the light emitting device 120 from emitting light to save power.

In this embodiment, the touch chip 41 is connected to the light emitting device 120, and the light emitting device 120 may include a plurality of LEDs 121 to 124. However, the disclosure is not limited to the number of LEDs. The touch chip 41 may control the LEDs 121 to 124 through the general input/output signals GPIO1 to GPIO4. In some embodiments, the touch chip 41 may simulate the general input/output signals GPIO1 to GPIO4 as pulse width modulation (PWM) signals to control the brightness and light-emitting frequency of the LEDs 121 to 124 using the PWM signals. That is to say, when the processor 140 determines that the artificial intelligence function is activated, the processor 140 may control at least part of the LEDs 121 to 124 to emit light according to a specific lighting effect through the chipset 42 and the touch chip 41.

In some embodiments, in response to the artificial intelligence function belonging to a first category is activated, the processor 140 may control the light emitting device 120 to emit the indicative light according to a first specific lighting effect. In response to the artificial intelligence function belonging to a second category is activated, the processor 140 may control the light emitting device 120 to emit indicative light according to a second specific lighting effect. The first specific lighting effect is different from the second specific lighting effect. For example, when the content generation function (such as Copilot) using a large language model is activated, the light emitting device 120 may emit the indicative light according to a first specific lighting effect. When the human body presence detection function using the neural network model is activated, the light emitting device 120 may emit indicative light according to the second specific lighting effect.

Furthermore, the processor 140 may control the light emitting device 120 to display corresponding specific lighting effects according to the type of artificial intelligence function in operation. In some embodiments, the processor 140 may determine a corresponding lighting effect configuration profile according to the type of the activated artificial intelligence function. The lighting effect configuration profile includes multiple lighting parameters configured to define specific lighting effects, which may be used to determine the lighting effects displayed by the light emitting device 120. The lighting effect configuration profile may include brightness parameters, lighting frequency parameters or other lighting control parameters of multiple LEDs of the light emitting device 120. The processor 140 may control the light emitting device 120 to generate indicative light according to the lighting effect configuration profile. Specifically, the processor 140 can control the illumination of the LEDs of the light emitting device 120 based on numerous parameters within the lighting effect configuration profile, so that the light emitting device 120 may display a specific lighting effect corresponding to this lighting effect configuration profile.

In some embodiments, the artificial intelligence function may be classified into one of a first category and a second category based on whether a neural network processor 150 is applied. That is to say, when the neural network processor 150 executes a neural network calculation, the light emitting device 120 may emit a indicative light according to the first specific lighting effect. When a artificial intelligence function is activated but the neural network processor 150 does not execute any neural network calculation, the light emitting device 120 may emit a indicative light based on a second specific lighting effect. Based on this, the user or device developer may confirm whether the neural network processor 150 is operating normally according to the light emitting device 120. In addition, in some embodiments, when the artificial intelligence function used by the user changes, the light effect displayed by the light emitting device 120 may also automatically switch accordingly.

Figure 5:
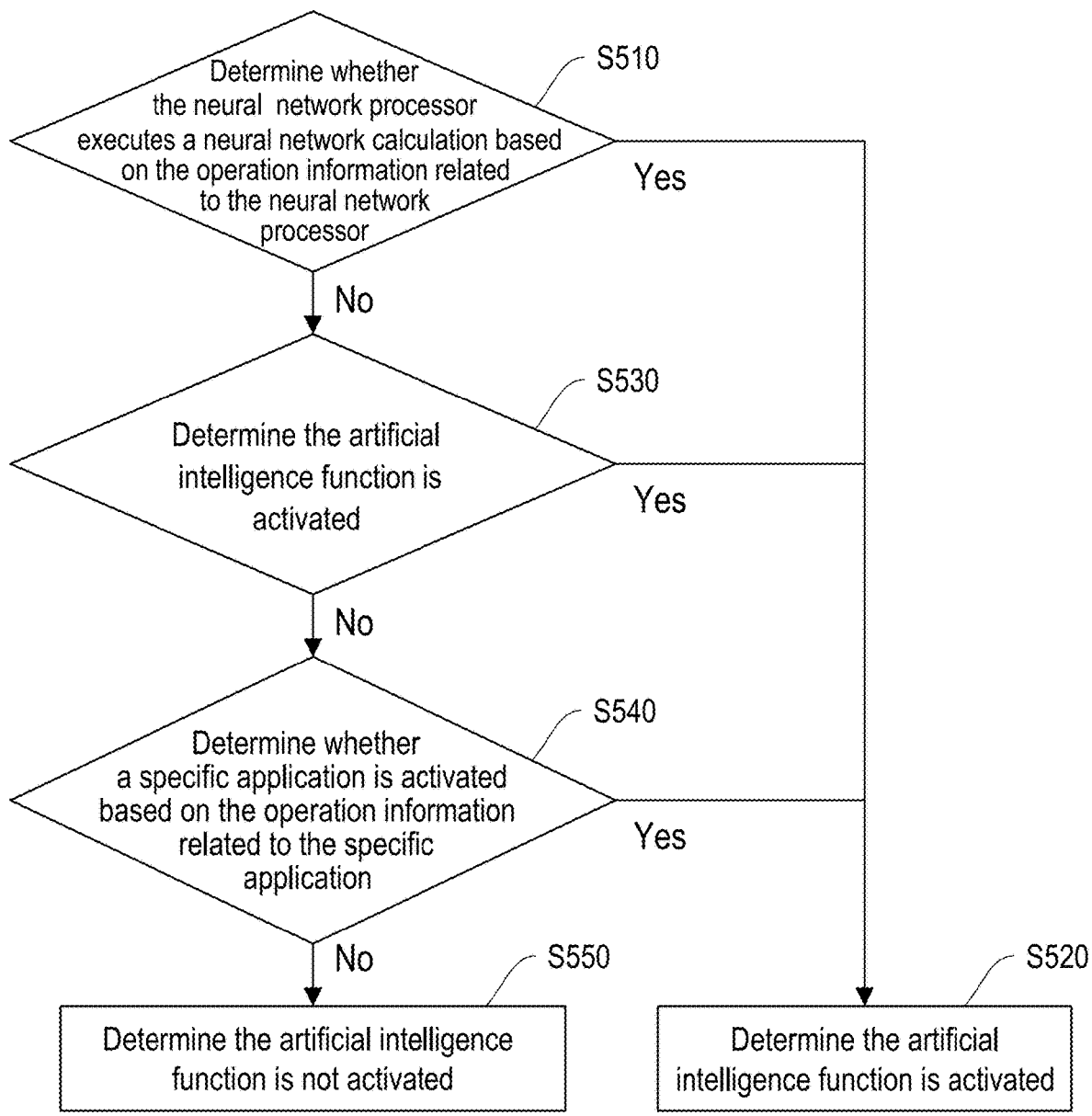
FIG. 5 is a flowchart of determining whether the artificial intelligence function is activated according to an embodiment of the disclosure.
Figure 6:
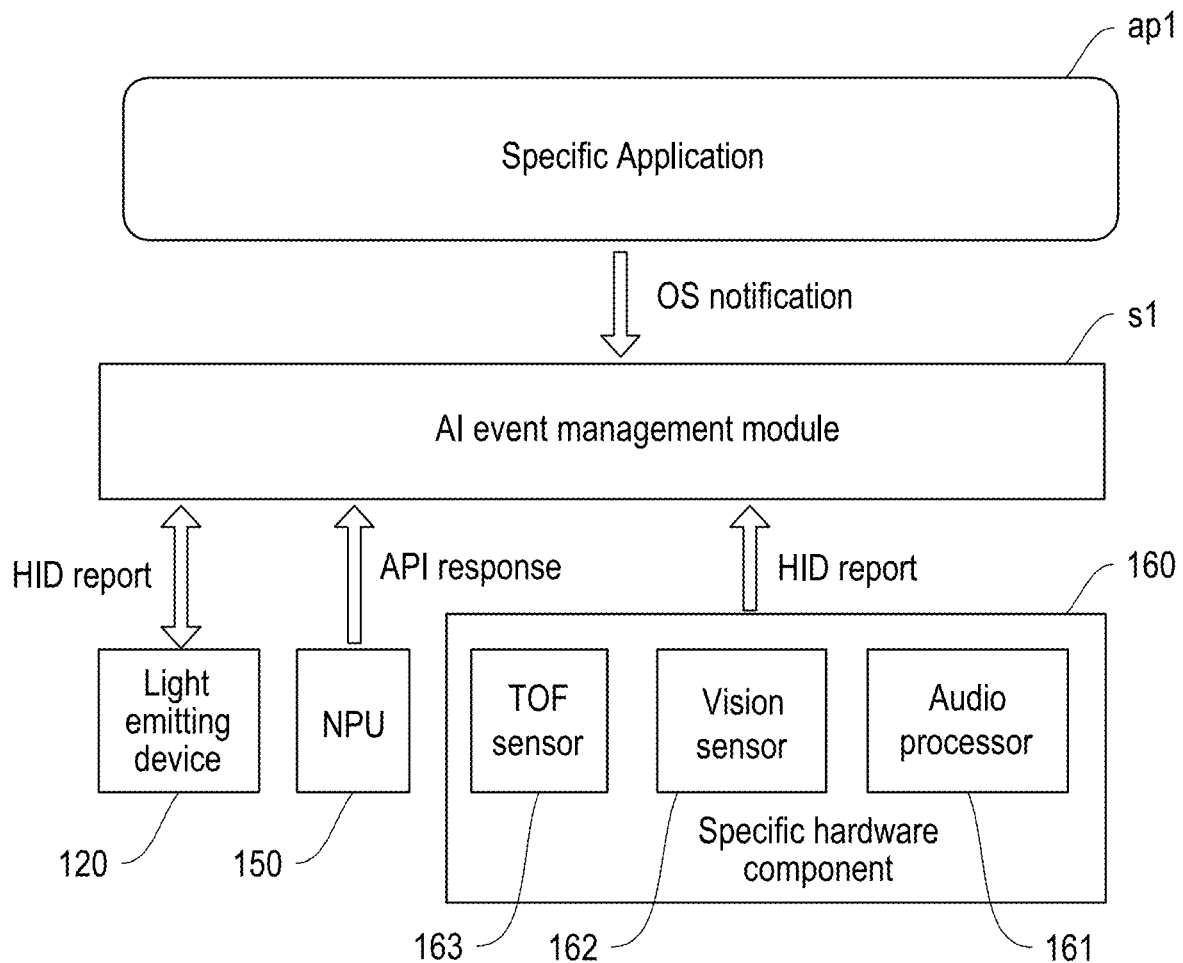
FIG. 6 is a schematic diagram of the system architecture of an electronic device according to an embodiment of the disclosure.

FIG. 5 is a flowchart for determining whether the artificial intelligence function is activated according to an embodiment of the disclosure. Referring to FIG. 5, in some embodiments, step S220 shown in FIG. 2 may be implemented as step S510 to step S550. In addition, in order to clearly illustrate the principle of this embodiment, FIG. 6 is supplemented for description below. FIG. 6 is a schematic diagram of the system architecture of an electronic device according to an embodiment of the disclosure. In the embodiment of FIG. 6, the processor 140 may execute the AI event management module s1 to monitor the operation information related to the artificial intelligence function, and control the light emitting device 120 accordingly. In some embodiments, the AI event management module s1 may be implemented as a background service program running within the operating system.

In step S510, the processor 140 may determine whether the neural network processor 150 executes a neural network calculation based on the operation information related to the neural network processor 150. If step S510 is determined as yes, in step S520, the processor 140 determines that the artificial intelligence function is activated in response to determining that the neural network processor 150 executes the neural network calculation.

Specifically, the AI event management module s1 may communicate with the neural network processor 150 through an application programming interface (API). The neural network processor 150 may send back an API response regularly or irregularly to the AI event management module s1 to inform the computing load of the neural network processor 150. According to the computing load reported by the neural network processor 150, the AI event management module s1 executed by the processor 140 may determine that the neural network processor 150 is either executing a neural network calculation or is in an idle state. When the computing load reported by the neural network processor 150 is greater than the threshold, the processor 140 may determine that the neural network processor 150 is executing a neural network calculation. On the contrary, when the computing load reported by the neural network processor 150 is not greater than the threshold, the processor 140 may determine that the neural network processor 150 is in an idle state. However, when the neural network processor 150 is executing the neural network calculation, at least one artificial intelligence function is activated and is operating.

In step S530, the processor 140 may determine whether the specific application ap1 is activated based on the operation information related to the specific application ap1. If step S530 is determined as yes, in step S520, the processor 140 may determine that the artificial intelligence function is activated in response to determining that the specific application ap1 is activated In some embodiments, the specific application ap1 with the artificial intelligence function may issue an operating system (OS) notification to inform the AI event management module s1 whether the artificial intelligence function of the specific application ap1 is activated. For example, the specific application ap1 may be a word processing application, and the word processing application may provide a content generation function. When the user uses the content generation function of the word processing application, the word processing application may send an OS notification to the AI event management module s1. Based on this, the AI event management module s1 may confirm that the artificial intelligence function is activated based on the OS notification sent by the specific application ap1.

Alternatively, in other embodiments, when a specific application that specifically provides a certain artificial intelligence function is activated, the processor 140 may determine that the artificial intelligence function is activated. Specifically, the processor 140 may obtain at least one application currently running through the task manager of the operating system, and determine whether the at least one application currently running includes a specific application. If a specific application is included, the artificial intelligence function of the specific application has been activated.

In step S540, the processor 140 may determine whether the specific hardware component 160 performs the artificial intelligence function based on the operation information related to the specific hardware component 160. If step S540 is determined as yes, in step S520, the processor 140 determines that the artificial intelligence function is activated in response to determining that the specific hardware component 160 performs the artificial intelligence function.

In some embodiments, the underlying firmware code of specific hardware components 160 may provide the artificial intelligence function. In some embodiments, the specific hardware components 160 may be used to provide sensing data for artificial intelligence functions. Therefore, the specific hardware component 160 may send a HID report to the AI event management module s1 via the Human Interface Device (HID) protocol to notify the AI event management module s1 that the specific hardware component 160 is performing an artificial intelligence function.

As shown in FIG. 6, in some embodiments, the specific hardware component 160 may include an audio processor 161, a visual sensor 162 and a TOF sensor 163. When the audio processor 161 is performing the noise reduction function using the neural network model or other audio optimization functions using the neural network model, the audio processor 161 may send a HID report to the AI event management module s1, so that the AI event management module s1 may learn about the audio processor 161 is performing artificial intelligence functions. When the visual sensor 162 is performing the image processing function using the neural network model or the object recognition function using the neural network model, the visual sensor 162 may send a HID report to the AI event management module s1, so that the AI event management module s1 may be notified about the visual sensor 162 is performing an artificial intelligence function. When the ToF sensor 163 is used to apply the object detection function of the neural network model, the ToF sensor 163 may send a HID report to the AI event management module s1, so that the AI event management module s1 may be notified about the ToF Sensor 163 is performing an artificial intelligence function.

In some embodiments, when the AI event management module s1 determines that the artificial intelligence function is activated according to step S510, step S530 or step S540, the processor 140 may execute the AI event management module s1 to control the light emitting device 120. Specifically, the AI event management module s1 may control the light emitting device 120 to generate patterned indicative light by issuing a HID report.

In some embodiments, the light emitting device 120 may support the Lighting and Illumination standard of the HID specification released by Microsoft Corporation, so that the operating system running in the operating system may directly control the LED of the light emitting device 120. Based on the Lighting and Illumination standard of the HID specification, each LED of the light emitting device 120 may be mapped to a logical position according to the length, width and height of the light emitting device 120, and this logical position is used as the identification feature of the LED. Since the program module in the operating system may control the LEDs of the light emitting device 120 directly, the lighting effect of the light emitting device 120 may be controlled by the service program (i.e., the AI event management module s1) running in the user mode. Alternatively, in some embodiments, the AI event management module s1 may send a customized HID report according to the HID protocol to control the light emitting device 120.

If step S540 is determined as no, in step S550, the processor 140 may determine that the artificial intelligence function is not activated. In this case, when it is determined that the artificial intelligence function is not activated, the processor 140 may control the light emitting device 120 not to emit the indicative light. Based on this, users may also know that there are currently no artificial intelligence functions in service.

Figure 7:
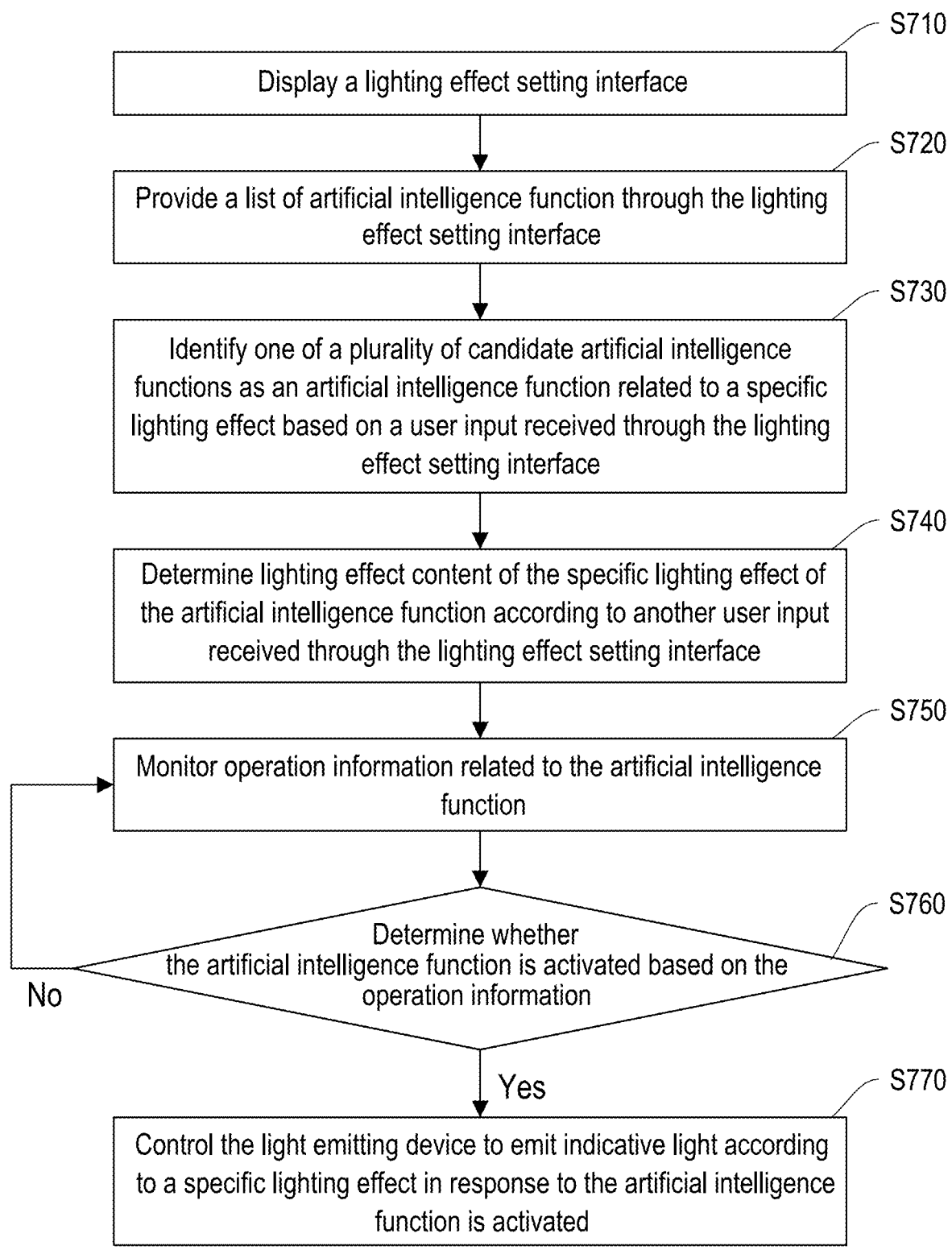
FIG. 7 is a flowchart of an operational state indication method using lighting effect according to an embodiment of the disclosure.

FIG. 7 is a flowchart of an operational state indication method using lighting effect according to an embodiment of the disclosure, and the method flow of FIG. 7 may be implemented by components of the electronic device 100 of FIG. 1. Referring to FIG. 1 and FIG. 7, the following is a description of the steps of the operational state indication method using lighting effect in this embodiment with reference to various components of the electronic device 100 in FIG. 1.

In step S710, the processor 140 may display a lighting effect setting interface by using the display 110. The lighting effect setting interface provides an intuitive and easy-to-operate graphical interface, allowing users to define specific lighting effects for artificial intelligence functions.

In step S720, processor 140 may provide a list of artificial intelligence function through the lighting effect setting interface. This list of artificial intelligence function includes a plurality of candidate artificial intelligence functions. Specifically, the processor 140 may list all artificial intelligence functions supported by electronic device 100 (that is, candidate artificial intelligence functions) through the list of artificial intelligence function. In some embodiments, when the electronic device 100 is equipped with a new artificial intelligence function due to software installation or software/firmware update, the list of artificial intelligence function may also list the new artificial intelligence function for the user to select.

In step S730, the processor 140 may identify one of the candidate artificial intelligence functions as an artificial intelligence function related to a specific lighting effect based on the user input received through the lighting effect setting interface. That is to say, the user may decide which artificial intelligence function activate the illumination of the light emitting device 120 according to their own preferences and needs. More specifically, the processor 140 may select an artificial intelligence function corresponding to a specific lighting effect from the list of artificial intelligence function based on user input. For example, according to user input, the processor 140 may control the light emitting device 120 to emit light in response to the enabling of the first artificial intelligence function, but does not control the light emitting device 120 to emit light in response to the enabling of the second artificial intelligence function.

In some embodiments, the processor 140 may further determine whether the activated artificial intelligence function is an artificial intelligence function corresponding to a specific lighting effect. When the activated artificial intelligence function is an artificial intelligence function corresponding to a specific lighting effect, the processor 140 controls the light emitting device 120 to emit light. Otherwise, when the activated artificial intelligence function is not the artificial intelligence function corresponding to the specific lighting effect, the processor 140 controls the light emitting device 120 not to emit light.

In step S740, the processor 140 may determine the lighting effect content of the specific lighting effect of the artificial intelligence function according to another user input received through the lighting effect setting interface. That is to say, the lighting effect content of specific lighting effects may also be customized by the user.

Figure 8:
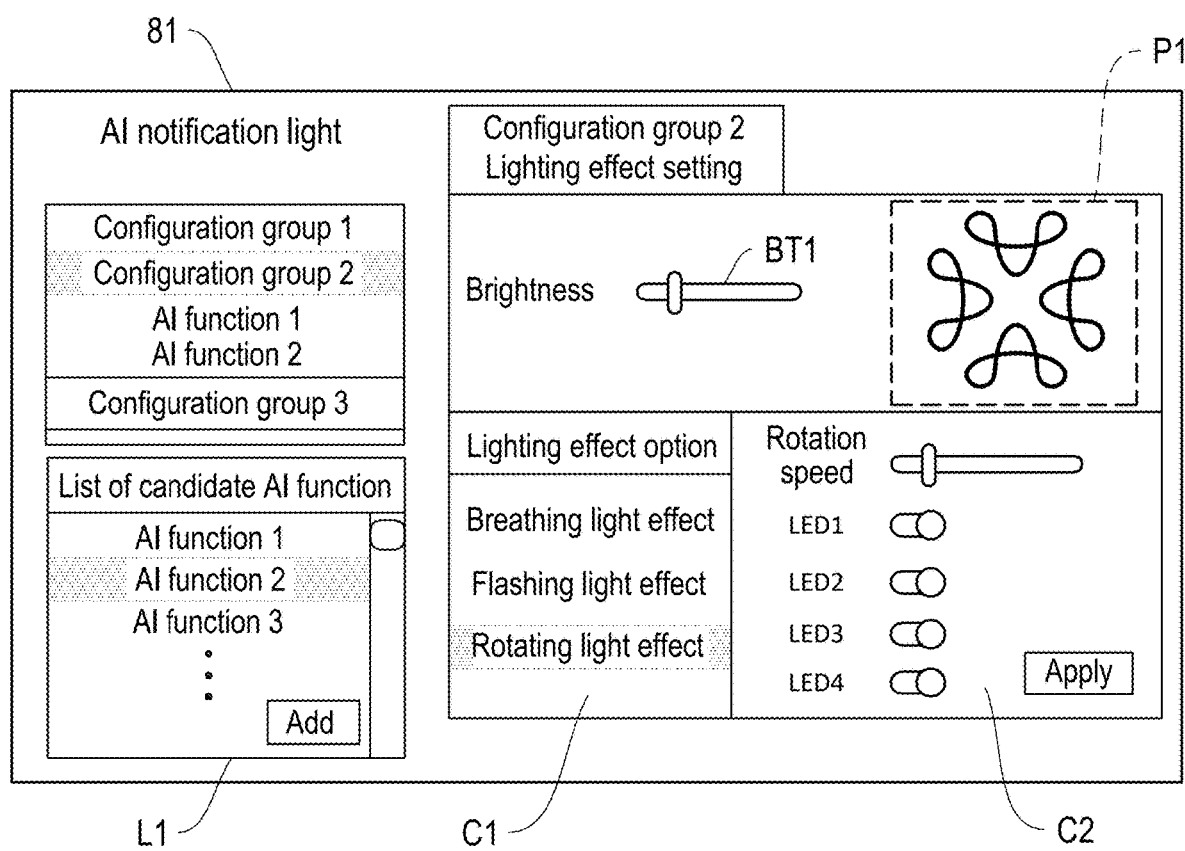
FIG. 8 is a schematic diagram of a lighting effect setting interface according to an embodiment of the disclosure.

For example, FIG. 8 is a schematic diagram of a lighting effect setting interface according to an embodiment of the disclosure. Referring to FIG. 8, the display 110 may display the lighting effect setting interface 81, which is a GUI. The lighting effect setting interface 81 includes a list of artificial intelligence function L1. According to the click operation on the list of artificial intelligence function L1, the processor 140 may identify a candidate artificial intelligence function as requiring indicator light and add the selected artificial intelligence function to a configuration group. The user may set corresponding specific lighting effects for each configuration group.

As shown in FIG. 8, the user may set the light brightness of the light emitting device 120 by dragging the cursor on the brightness adjustment bar BT1 in the light effect setting interface 81. That is, in response to the user input applied to the brightness adjustment bar BT1, the processor 140 may set the light brightness corresponding to at least one artificial intelligence function in a certain light effect configuration group. In addition, the user may select a target lighting effect from a plurality of preset lighting effects in the lighting effect field C1 in the lighting effect setting interface 81. That is, in response to the user input in the lighting effect field C1, the processor 140 may set a specific lighting effect corresponding to at least one artificial intelligence function in a configuration group. In addition, the user may set the lighting effect parameters of the selected specific lighting effect in the specific lighting effect setting field C2 of the lighting effect setting interface 81. That is, in response to user input in the specific lighting effect setting field C2, the processor 140 may set lighting effect characteristics corresponding to one or more artificial intelligence functions. For example, when the user selects the rotating light effect in the light effect field C1, the user may further set the rotation speed of the rotating light effect or the number of LEDs involved in emitting light in the specific lighting effect setting field C2. In addition, the lighting effect setting interface 81 may also include a lighting effect preview zone P1. This lighting effect preview zone P1 may provide a lighting effect preview function according to the user's settings, so that the user may preview whether the specific lighting effect that he or she has set is desirable.

Afterwards, in step S750, the processor 140 may monitor operation information related to the artificial intelligence function. In step S760, the processor 140 may determine whether the artificial intelligence function is activated based on the operation information. In step S770, in response to the activation of the artificial intelligence function, the processor 140 may control the light emitting device 120 to emit indicative light according to a specific lighting effect. The detailed implementation details of step S750 to step S770 may be described with reference to the foregoing embodiments, and is not be described again here.

To sum up, in embodiments of the disclosure, by monitoring the operation information related to the artificial intelligence function, it may be determined whether the artificial intelligence function is activated. When the artificial intelligence function is activated, the light emitting device may emit indicative light with specific lighting effects. Based on this, the light emitting device may provide corresponding indicative light effects based on the activation of artificial intelligence functions, so that users may clearly understand whether the current operation uses the artificial intelligence functions of the electronic device, greatly improving the transparency of the operation of artificial intelligence functions and user experience. Furthermore, the lighting effects of the light emitting device can meet users' personalized needs, providing them with a unique visual lighting experience.

Although the disclosure has been disclosed above through embodiments, they are not intended to limit the disclosure. Anyone with ordinary knowledge in the relevant technical field may make some changes and modifications without departing from the spirit and scope of the disclosure. Therefore, the protection scope of the disclosure shall be determined by the appended patent application scope.

What is claimed is:

1. An operational state indication method using lighting effect, adapted to an electronic device comprising a light emitting device, and comprising:
monitoring operation information related to an artificial intelligence function;
determining whether the artificial intelligence function is activated based on the operation information; and
controlling the light emitting device to emit indicative light according to a specific lighting effect in response to the artificial intelligence function being activated.

2. The operational state indication method using lighting effect according to claim 1, wherein the electronic device further comprises a neural network processor, and the step of determining whether the artificial intelligence function is activated based on the operation information comprises:
determining whether the neural network processor executes a neural network calculation based on the operation information related to the neural network processor; and
determining that the artificial intelligence function is activated in response to determining that the neural network processor executes the neural network calculation.

3. The operational state indication method using lighting effect according to claim 1, wherein the step of determining whether the artificial intelligence function is activated based on the operation information comprises:
determining whether a specific application is activated based on the operation information related to the specific application; and
determining that the artificial intelligence function is activated in response to determining that the specific application is activated.

4. The operational state indication method using lighting effect according to claim 1, wherein the step of determining whether the artificial intelligence function is activated based on the operation information comprises:
determining whether a specific hardware component performs the artificial intelligence function based on the operation information related to the specific hardware component; and
determining that the artificial intelligence function is activated in response to determining that the specific hardware component performs the artificial intelligence function.

5. The operational state indication method using lighting effect according to claim 4, wherein the specific hardware component comprises a sensor or an audio processor.

6. The operational state indication method using lighting effect according to claim 1, wherein the step of controlling the light emitting device to emit the indicative light according to the specific lighting effect in response to the artificial intelligence function being activated comprises:
in response to that the artificial intelligence function belonging to a first category is activated, controlling the light emitting device to emit the indicative light according to a first specific lighting effect; and
in response to that the artificial intelligence function belonging to a second category is activated, controlling the light emitting device to emit the indicative light according to a second specific lighting effect,
wherein the first specific lighting effect is different from the second specific lighting effect.

7. The operational state indication method using lighting effect according to claim 6, wherein the artificial intelligence function is classified into one of the first category and the second category based on whether a neural network processor is applied.

8. The operational state indication method using lighting effect according to claim 1, further comprising:
displaying a lighting effect setting interface;
providing a list of artificial intelligence function through the lighting effect setting interface, wherein the list of artificial intelligence function comprises a plurality of candidate artificial intelligence functions; and
identifying one of the candidate artificial intelligence functions as the artificial intelligence function related to the specific lighting effect according to a user input received through the lighting effect setting interface.

9. The operational state indication method using lighting effect according to claim 8, further comprising:
determining lighting effect content of the specific lighting effect of the artificial intelligence function according to another user input received through the lighting effect setting interface.

10. The operational state indication method using lighting effect according to claim 1, wherein the light emitting device comprises a plurality of light-emitting diodes (LEDs).

11. An electronic device, comprising:
a light emitting device;
a storage device that records multiple instructions; and
a processor coupled to the light emitting device and the storage device, configured to:
monitor operation information related to an artificial intelligence function;
determine whether the artificial intelligence function is activated based on the operation information; and
control the light emitting device to emit indicative light according to a specific lighting effect in response to the artificial intelligence function being activated.

12. The electronic device according to claim 11, further comprising a neural network processor, wherein the processor is configured to:
determine whether the neural network processor executes a neural network calculation based on the operation information related to the neural network processor; and
determine that the artificial intelligence function is activated in response to determining that the neural network processor executes the neural network calculation.

13. The electronic device according to claim 11, wherein the processor is configured to:
determine whether a specific application is activated based on the operation information related to the specific application; and
determine that the artificial intelligence function is activated in response to determining that the specific application is activated.

14. The electronic device according to claim 11, wherein the processor is configured to:
determine whether a specific hardware component performs the artificial intelligence function based on the operation information related to the specific hardware component; and
determine that the artificial intelligence function is activated in response to determining that the specific hardware component performs the artificial intelligence function.

15. The electronic device according to claim 14, wherein the specific hardware component comprises a sensor or an audio processor.

16. The electronic device according to claim 11, wherein the processor is configured to:
in response to that the artificial intelligence function belonging to a first category is activated, control the light emitting device to emit the indicative light according to a first specific lighting effect; and
in response to that the artificial intelligence function belonging to a second category is activated, control the light emitting device to emit the indicative light according to a second specific lighting effect,
wherein the first specific lighting effect is different from the second specific lighting effect.

17. The electronic device according to claim 16, wherein the artificial intelligence function is classified into one of the first category and the second category based on whether a neural network processor is applied.

18. The electronic device according to claim 11, wherein the processor is configured to:
   display a lighting effect setting interface;
   provide a list of artificial intelligence function through the lighting effect setting interface, wherein the list of artificial intelligence function comprises a plurality of candidate artificial intelligence functions; and
   identify one of the candidate artificial intelligence functions as the artificial intelligence function related to the specific lighting effect according to a user input received through the lighting effect setting interface.

19. The electronic device according to claim 18, wherein the processor is configured to:
   determine lighting effect content of the specific lighting effect of the artificial intelligence function according to another user input received through the lighting effect setting interface.

20. The electronic device according to claim 11, wherein the light emitting device comprises a plurality of LEDs.

* * * * *